United States Patent [19]

Estes

[11] Patent Number: 5,280,891

[45] Date of Patent: Jan. 25, 1994

[54] PIPE WELDING SUPPORT APPARATUS

[76] Inventor: Rollin L. Estes, P.O. Box 1331, 535 Aspen Ave., Rifle, Colo. 81650

[21] Appl. No.: 20,550

[22] Filed: Feb. 22, 1993

[51] Int. Cl.$^5$ .............................................. B23Q 3/02
[52] U.S. Cl. ........................................ 269/60; 269/76; 269/296; 269/289 MR; 269/902; 254/98
[58] Field of Search ................. 254/98, 100, 133 A, 254/DIG. 1, DIG. 4, 93 H; 269/902, 289 MR, 76, 60, 296; 248/354.4

[56] References Cited

U.S. PATENT DOCUMENTS

| | | | |
|---|---|---|---|
| 568,543 | 9/1896 | Parks | 269/902 |
| 2,031,307 | 2/1936 | Gloekler | 269/76 |
| 2,273,813 | 2/1942 | Barber | 248/354.4 |
| 2,527,428 | 10/1950 | Kemerer | 254/93 H |
| 2,854,941 | 10/1958 | Vollmer | 269/289 MR |
| 3,741,509 | 6/1973 | Kelly | 248/354.4 |
| 5,101,932 | 4/1992 | Trudgeon | 269/902 |
| 5,165,665 | 11/1992 | Jolivette | 254/98 |

*Primary Examiner*—Robert C. Watson
*Attorney, Agent, or Firm*—Leon Gilden

[57] ABSTRACT

A plurality of telescoping tube members, each arranged for inter-locking relative to one another, are provided to include a threaded support rod threadedly directed within an uppermost of the tubes to position a pipe during a welding procedure. A modification of the invention includes support head structure arranged for mounting to the tube to accommodate various configurations of pipes.

1 Claim, 4 Drawing Sheets

PIPE WELDING SUPPORT APPARATUS

BACKGROUND OF THE INVENTION

1. Field of the Invention

The field of invention relates to pipe welding support structure, and more particularly pertains to a new and improved pipe welding support structure wherein the same is directed for the positioning of at least one pipe member during a welding procedure.

2. Description of the Prior Art

The support of pipes during welding is required inasmuch as the pipes must be positioned in a stable and aligned relationship relative to a welder, wherein the instant invention attempts to overcome deficiencies of the prior art by providing for a readily transportable and convenient structure permitting the support and accommodation of pipes at various heights and in this respect, the present invention substantially fulfills this need.

SUMMARY OF THE INVENTION

In view of the foregoing disadvantages inherent in the known types of support apparatus now present in the prior art, the present invention provides a pipe welding support apparatus wherein the same is directed to the positioning of pipes during a welding procedure. As such, the general purpose of the present invention, which will be described subsequently in greater detail, is to provide a new and improved pipe welding support apparatus which has all the advantages of the prior art support apparatus and none of the disadvantages.

To attain this, the present invention provides a plurality of telescoping tube members, each arranged for interlocking relative to one another, provided to include a threaded support rod threadedly directed within an uppermost of the tubes to position a pipe during a welding procedure. A modification of the invention includes a support head structure arranged for mounting to the tube to accommodate various configurations of pipes.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pipe welding support apparatus which has all the advantages of the prior art support apparatus and none of the disadvantages.

It is another object of the present invention to provide a new and improved pipe welding support apparatus which may be easily and efficiently manufactured and marketed.

It is a further object of the present invention to provide a new and improved pipe welding support apparatus which is of a durable and reliable construction.

An even further object of the present invention is to provide a new and improved pipe welding support apparatus which is susceptible of a low cost of manufacture with regard to both materials and labor, and which accordingly is then susceptible of low prices of sale to the consuming public, thereby making such pipe welding support apparatus economically available to the buying public.

Still yet another object of the present invention is to provide a new and improved pipe welding support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
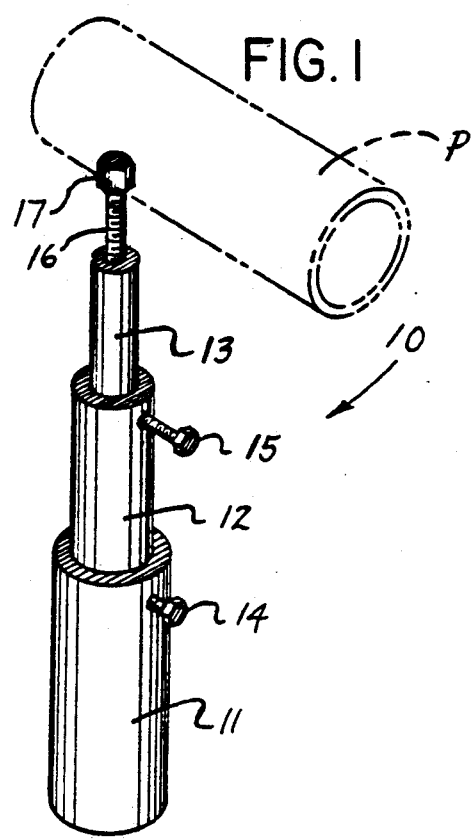
FIG. 1 is an isometric illustration of the invention in use.
Figure 2:
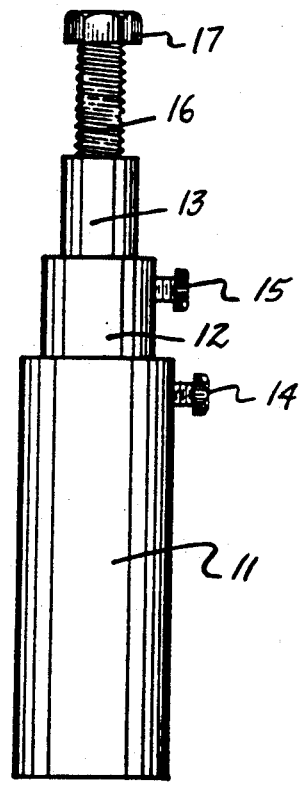
FIG. 2 is an orthographic side view of the invention.

With reference now to the drawings, and in particular to FIGS. 1 to 7 thereof, a new and improved pip welding support apparatus embodying the principles and concepts of the present invention and generally designated by the reference numeral 10 will be described.

Figure 3:
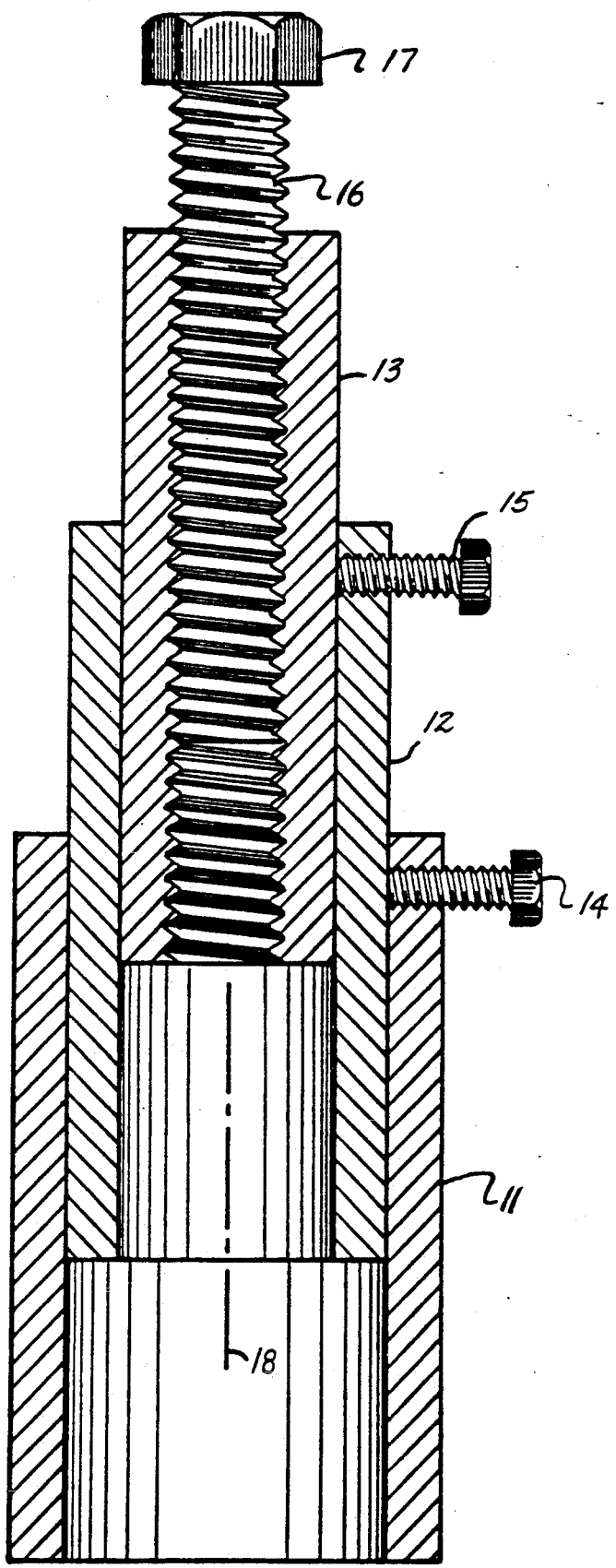
FIG. 3 is a cross-sectional illustration of the invention.

More specifically, the pipe welding support apparatus 10 of the instant invention essentially comprises a first tube 11 telescopingly receiving a second tube 12 that in turn telescopingly receives a third tube 13. The first, second, and third tubes 11-13 are coaxially aligned along a predetermined axis 18, as indicated in FIG. 3. A first fastener 14 threadedly directed through the first tube 14 intersects the second tube 12, with the first fastener oriented orthogonally relative to the axis 18, while a second fastener 15 threadedly directed through the second tube 12 abuts the third tube 13, with the second fastener 15 orthogonally oriented relative to the axis 18. An externally threaded position rod 16 is coaxially aligned along the axis 18 and threadedly received within the third tube 13, with the position rod 16 having a position rod lug 17 mounted at its uppermost distal end for support of a pipe "P", as indicated in FIG. 1.

Figure 4:
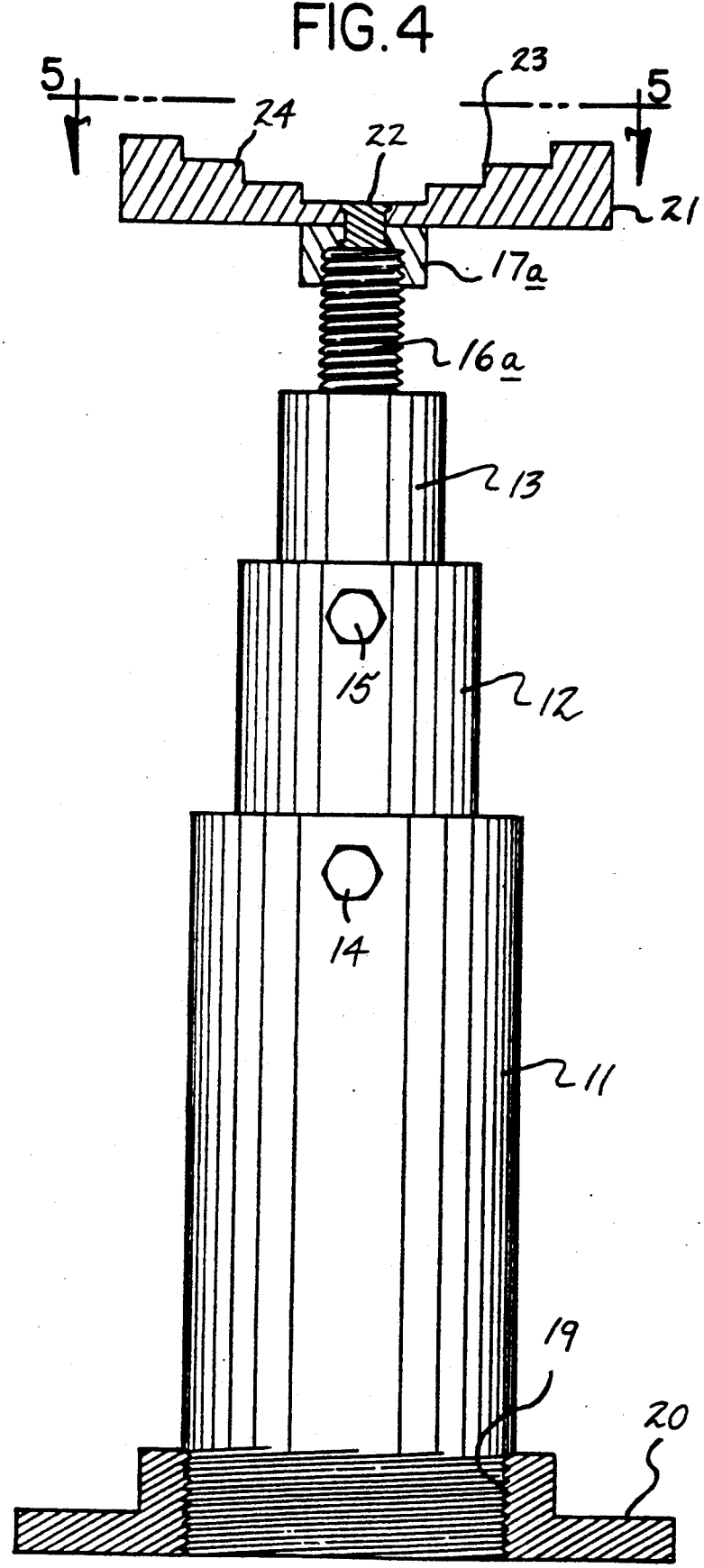
FIG. 4 is an orthographic view of the invention including a modified head support and base plate structure.
Figure 5:
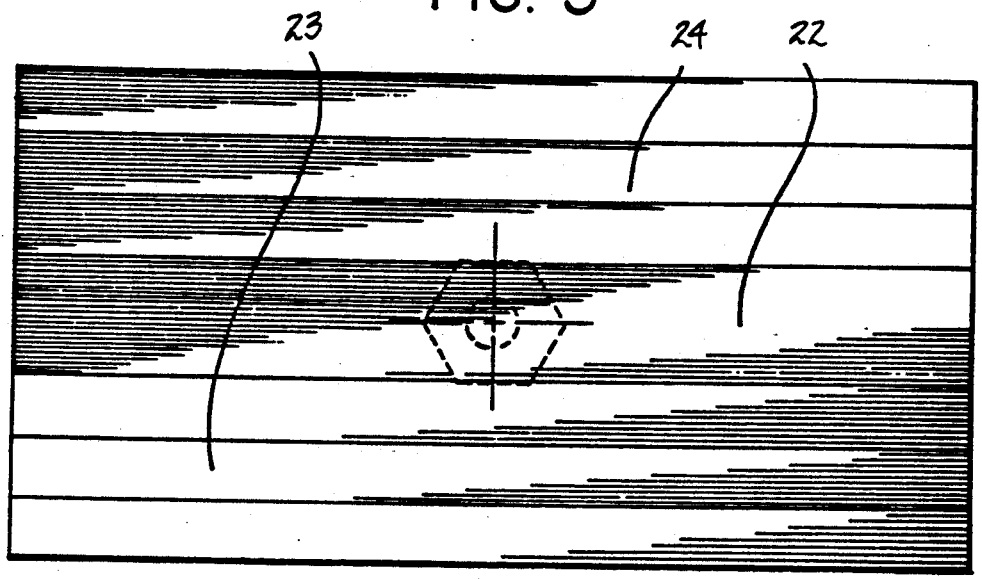
FIG. 5 is an orthographic view, taken along the lines 5—5 of FIG. 4 in the direction indicated by the arrows.
Figure 6:
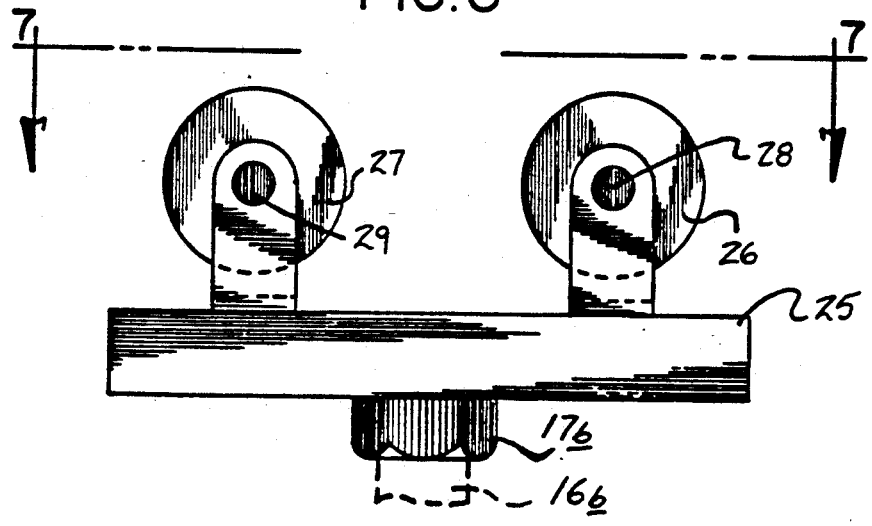
FIG. 6 is an orthographic side view of a further modified head structure employed by the invention.
Figure 7:
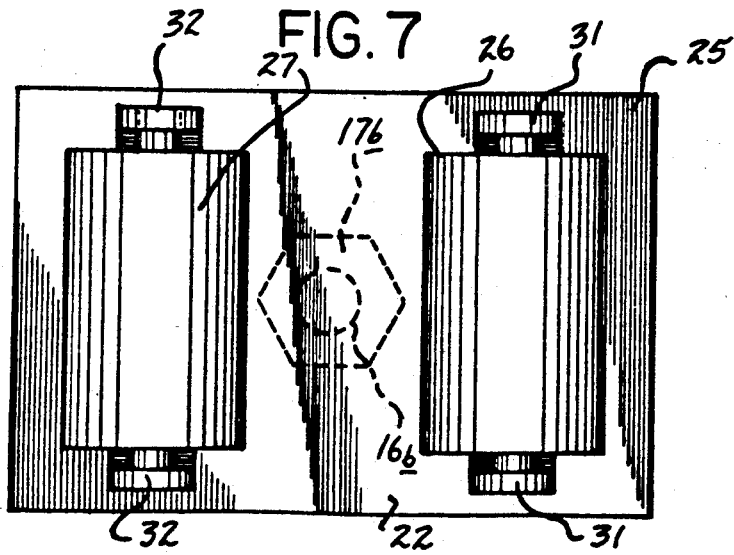
FIG. 7 is an orthographic view, taken along the lines 7—7 of FIG. 6 in the direction indicated by the arrows.

The FIG. 4 indicates the use of a modified position rod 16, having a modified lug head 17a supporting a head plate 21 orthogonally oriented relative to the axis 18, with the head plate 21 having a head plate top wall central recess 22 that extends orthogonally to the axis 18, with a first stepped top wall 23 and a second stepped top wall 24 mounted to the head plate 21, and more specifically to its top wall, in a mirror image facing relationship on opposed sides of the central recess 22 to support various pipes thereon. The head plate 21 is accordingly replaceably received within the third tube 13 as an alternative to the position rod 16 and its associated lug 17. A modified head plate 25 (see FIGS. 6 and 7) is provided, having respective first and second rollers 26 and 27 arranged in a parallel coextensive relationship relative to one another mounted to the modified head plate top wall 32. The first and second rollers 26 and 27 are rotatably mounted about respective first and second axles 28 and 29 that in turn are supported in a spaced relationship above the head plate top wall 32 by respective first and second axle supports 30 and 31. The first and second rollers accordingly permit accommodation of a plurality of sizes and associated diameters of pipes to be positioned during a welding procedure as the self-centering effect has rotatable first and second rollers 26 and 27 to direct such a pipe "P" (as indicated in FIG. 1) into positioning medially over the axis 18. It should be further noted that the first tube 11, as indicated in FIG. 4, is arranged to further include a first tube lower end portion 19 that is externally threaded to threadedly receive a base plate 20. The base plate is threadedly receive a relative to the first tube lower end portion for ease of storage of the organization during periods of non-use for providing additional stability to the apparatus in use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pipe welding support apparatus, comprising,
    a first tube, a second tube, and a third tube, the first tube telescopingly receiving the second tube in a sliding relationship, with the second tube telescopingly slidably receiving a third tube in a sliding relationship, wherein the first tube, the second tube, and the third tube are coaxially aligned along a predetermined axis, and
    a first fastener threadedly directed through the first tube orthogonally oriented relative to the axis intersecting the second tube, with the second tube threadedly receiving a second fastener directed therethrough orthogonally oriented relative to the axis intersecting the third tube, and
    the third tube including an externally threaded position rod threadedly directed into the third tube coaxially aligned relative to the third tube arranged in an extensible relationship relative to the third tube, with the position rod having a lug member mounted to a free distal end of the position rod for accommodating a pipe member thereon, and
    the tube includes a first tube lowermost externally threaded end portion, and a base plate, including an internally threaded central opening threadedly received through the lowermost end portion removably mounted relative to the lowermost end portion, with the base plate orthogonally oriented relative to the axis to impart stability to the first tube in use, and
    a further position rod, and the further position rod includes a further lug, and the further lug includes a head plate fixedly mounted to the further lug, with the head plate orthogonally oriented relative to the axis, and the further position rod threadedly received within the third tube upon removal of the position rod, and the head plate including a top wall central recess orthogonally oriented relative to the axis, and a first stepped top wall portion and a second stepped top wall portion arranged in a facing mirror image relationship relative to one another on opposed sides of the top wall central recess, and
    a modified head plate, wherein the modified head plate includes a modified position rod fixedly and orthogonally mounted medially of the head plate, with the head plate orthogonally oriented relative to the modified position rod, and the modified position rod arranged for selective reception within the third tube, and the modified head plate including a modified head plate top wall, the modified head plate top wall including a first axle support and a second axle support, the first axle support having a first axle, the second axle support having a second axle, the first axle and the second axle arranged in a parallel relationship relative to one another in a coextensive relationship, with the first axle including a first roller, the second axle having a second roller, the first roller and the second roller each having an equal predetermined diameter rotatably mounted about the respective first axle and the second axle to accommodate a workpiece thereon.

* * * * *